United States Patent Office 2,718,700
Patented Sept. 27, 1955

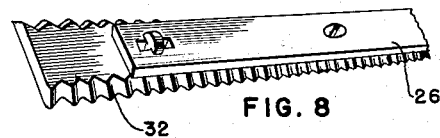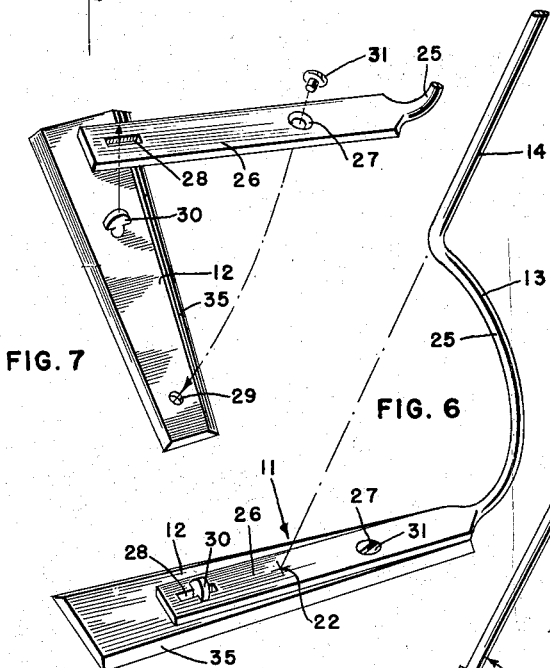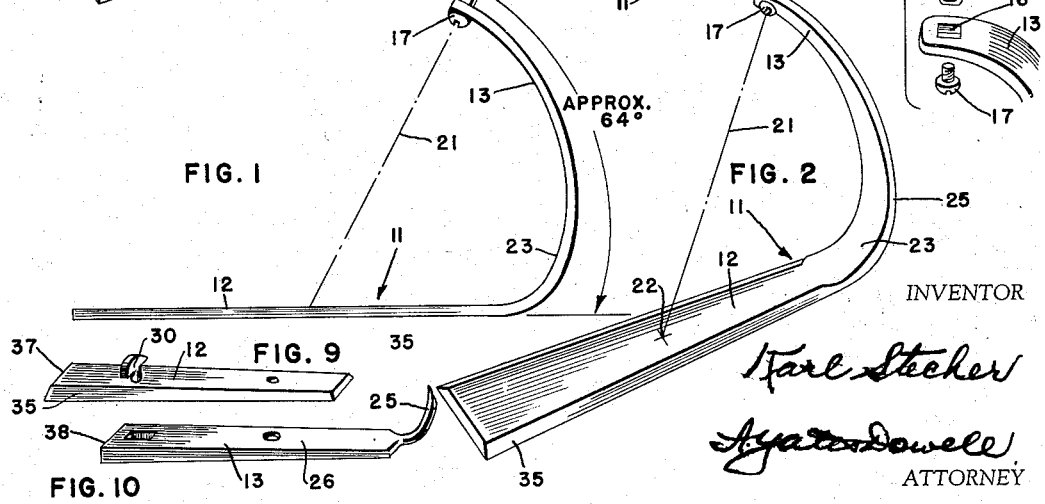

2,718,700

GRASS AND WEED CUTTER

Karl Stecher, Chevy Chase, Md.

Application October 21, 1953, Serial No. 387,369

5 Claims. (Cl. 30—318)

This invention relates to harvesting and more particularly to equipment employed in connection therewith. Specifically, the invention relates to a cutting tool operated by a swinging motion for severing weeds, grass, or other growth.

The invention is concerned primarily with a swinging-type weed or grass cutter having an elongated handle with a cutting head disposed at one end thereof and such handle being adapted to be gripped and swung to cause the cutting head to engage and sever the grass, weeds, or other material.

Heretofore, devices of this character have not been satisfactory due to the fact that they have not had the proper balance and have depended for their cutting ability upon the application of physical force exerted by the user and transmitted to a lightweight cutting blade by means of a handle, the energy exerted being reduced in proportion to the length of such handle. They have also had the major portion of the blade disposed at one side of the axis of the handle resulting in the unbalanced disposition of the cutting blade.

With these prior art structures it was necessary to grasp the handles tightly to prevent them from turning in the hand which resulted in early fatigue of the arms of the operator. Attempts have been made to overcome the problem of the device turning in the hands of the operator during use of the same by providing flattened or non-circular handle portions and by attaching both ends of the blade to the handle, but this latter structure proved a disadvantage because the supporting means would engage the weeds or grass to be cut ahead of the cutting blade and reduce the force of the impact between the blade and the grass, as well as by preventing the falling of the grass and weeds after being cut, and also resulting in matting in front of the implement.

Prior devices have been unsatisfactory also because of the great muscular effort required to hold the implement in the proper position of use which resulted in strain on the arms.

In other words, prior art devices have employed relatively slender and lightweight blades of substantially uniform weight from end to end, and with the center of gravity offset from the longitudinal axis of the handle resulting in improper balance and requiring tight grasping of the handle and great power in the use of the same.

It is an object of the invention to provide a simple, inexpensive, practical, efficient swinging type grass or weed cutter having a relatively heavy integrally or separately formed cutting head, with the weight of the same located on both sides of the axis of the handle, thereby providing a balanced head having no tendency to turn in the hands but which can be wielded with minimum effort and in an easy free swinging pendulum-like motion or stroke which will effectively cause the cutting or working head or blade to travel through and sever weeds, matted grass, brush, or other growth without undue exertion on the part of, or without the device turning in the hands of, the operator, and with maximum efficiency resulting from its use.

A further object of the invention is to provide a grass or weed cutter of the swinging type with the proper overall weight distribution for minimum effort of use and to effect cutting with the ease of the swinging of a well balanced pendulum by providing a point of balance, as distinguished from the center of gravity, located approximately one-fourth of the distance from the intersection of the longitudinal and transverse axis of the cutting head with the axis of the handle extended and the remote end of the handle.

A still further object of the invention is to provide an improved grass or weed cutter of the swingable type having a cutting or working head attached at one end thereof and left free and unsupported at the other end with the axis of the handle intersecting the blade substantially at the longitudinal and transverse axes thereof.

It is a further object of this invention to provide a weed-cutting implement of the swinging type that will cut through weeds without turning to one side, sliding off the weeds or trailing the handle through the area to be cut without effective cutting.

It is a further more specific object of this invention to provide an improved swinging weed-cutting implement having a working head wherein the weight of the working head is so distributed to increase progressively in the direction of the free end of the cutting blade so as to locate the center of gravity of the working head at or near the axis of the handle of the cutting implement.

Further objects and advantages of the invention will become apparent from the following description taken in conjunction with the accompanying drawings, wherein:

Fig. 1 is a side elevation of the improved cutting implement;

Fig. 2, a perspective view of the implement, especially illustrating the progressively broadened cutting blade by which a concentration of weight is effected in the working head;

Fig. 3, a detail, exploded perspective view illustrating one mode of connecting the carrier bar to the handle;

Fig. 4, a perspective view illustrating the modification of the implement to serve as a cutter for heavy brush;

Fig. 5, a diagram illustrating the critical configuration of the implement;

Fig. 6, a perspective view of a modification of the implement, wherein the cutting blade is made readily removable for sharpening, Fig. 7, a detail perspective view illustrating the mode of reattaching the sharpened blade;

Fig. 8, a perspective view of the cutting blade, illustrating a type of corrugation which lends itself to sharpening;

Fig. 9, a perspective view of the cutter wherein progressively increasing weight is obtained by thickening said cutter; and Fig. 10, a detail perspective view of the carrier bar wherein progressively increasing weight is obtained by thickening of said bar.

Briefly stated, the invention is a swinging-type weed cutter comprising an elongated handle, a carrier or connecting bar and a cutting head joined by the carrier bar to the handle transversely of the axis of the latter. The longitudinal and transverse centers of the cutting head are intersected by the axis of the handle when the latter is extended. Also the head progressively increases in weight from its attached end to its free end and the weight of the cutting head between the point of intersection and its free end being counter-balanced by the rear end portion of said cutting head and the connection between the same and said handle so that when the handle of the cutter is rotated the portions of the device on opposite sides of the axis of the same will counterbalance each other. Also the tool is provided with longitudinal cutting edges which are sharpened to provide cutting surfaces. These cutting surfaces may be integral with the head or carried by an independent member detachably connected to the head.

The implement 10 in each of the several views of the drawing has an elongated handle at one end of which the working head 11 is carried either by being attached to it as in Figs. 1, 2 and 4 or by being made integral as in Figs. 6, 7 and 10. The manner of connecting the handle and working head is optional, but each of the two types of connections has its advantage as presently pointed out.

As seen in the drawings, the implement comprises three principal elements, namely, the handle and working head already mentioned, and a (the all-important) cutting blade 12. The blade, obviously, does the cutting of weeds, grass or the like in every instance whether it is an integral part of the working head or is made separate therefrom to facilitate manufacture and eventual sharpening.

Respecting the two-part handle and working head, the handle portion 14 consists of a metal rod or an equivalent metal ferrule as in Fig. 4, which is made non-circular at 15 (Fig. 3) to occupy a correspondingly shaped hole 16 in the upper extremity of the carrier bar 13, thus assuring the prevention of turning of the working head relative to the handle. A screw 17 with a head large enough to overlap the side margins of the hole 16, is driven into a threaded hole in the center of the non-circular portion, thus to secure the metal rod and carrier bar.

The advantage of making the handle portion and working head separate is that each may be made of a grade of steel different from the other, the higher grade being confined to the working head. Where the working head and handle are one-piece, the advantage is derived from a lower cost of manufacture. A third advantage occurs when the cutting blade 12 is made a separate element in the cutting head. Original manufacture and sharpening and ultimate resharpening are facilitated.

Attention is now directed to the working head 11 which herein is purposely denominated a heavy working head. The distribution of weight as between the handle and working head is such that if the implement were balanced on a fulcrum, the point of balance would occur approximately at 18 (Fig. 5) which is relatively near the cutting head, that is, about one-fifth to one-fourth the distance from the point of intersection of the axis of the handle with the blade and the opposite end of the handle. The weight is thus mostly concentrated in the working head and enables the fulfilling of the chief objects of the invention such as the pendulum-like swinging of the implement with enough momentum to insure cutting through tough clumps of weeds or grass. The coincidence of the center of gravity of the cutting head with the axis of the handle extended is an important factor in keeping the blade in proper position, without turning during use.

As can be understood from the last statement, the cutting efficiency of the implement depends on an adequate foot-poundage behind the cutting blade on impact to force it through the weeds. If the cutting blade were relatively light, which in fact is the current fault of prior art devices of this sort, the effectiveness in cutting must be achieved by the exertions of the user, and these must become more violent as fatigue begins to make itself felt. A whip-like or slicing motion is effective only to the extent of the vigor behind it, but by concentrating the weight in the working head, the user may be more deliberate in performing the strokes and will expend less effort and cut a cleaner swath than with prior devices.

A large contribution to the foregoing cutting efficiency lies in that configuration which locates the center of gravity 22 of the implement preferably at the midpoint of the cutting blade and at a place on the working head intersected by the extension 21 of the axis of the handle.

To effect this disposition of the center of gravity, the handle is pitched at an obtuse angle to the horizontal in the direction of the free and unsupported end of the cutting blade and the mass of the working head is distributed equally, or substantially so, on all sides.

While experimentation has proven that the best results are obtained from the attachment of the handle to the blade in such a manner that the axis of the handle extended intersects the transverse and longitudinal centers of gravity of the blade, variation is, of course, permissible, the amount of variation determining the decrease in efficiency of the device. The heavier the growth cut, the more essential it is to have minimum displacement from the desired center of gravity of the cutting head as well as to have the cutting head of a weight proportionate to the force needed to be exerted in the cutting operation or, in other words the weight necessary to supply the necessary foot pounds.

My experiments clearly demonstrate, however, that even with the light-weight working heads of the prior art construction, the limitations set forth above cannot be exceeded without the operator experiencing a marked tendency for the implement to turn in his hands during use and a sense of wrist strain in holding the implement in the proper position.

Since the mounting portion of the working head is an adjunct necessary to the connection of the working head to the handle, the amount of metal in it at one side of the center of gravity and the axis of the handle must be offset at the other side of the center of gravity and axis of the handle. This offsetting is accomplished by making the working head progressively heavier from a place proximate to the handle to its free extremity.

While the cutting blade 12 is disclosed as broadened or increased in width towards its free end to progressively increase the weight as disclosed in Fig. 9, the same effect may be achieved by gradually increasing the thickness of the blade, while in Fig. 10, the same effect is obtained by progressively thickening the carrying bar to which the blade is attached. It will be understood therefore that these are mere illustrations of how the desired end, namely, providing the proper balance is achieved and whether the outer portion of the blade be made heavier by an integral or a separate weighted portion.

In Figs. 6 and 7 the carrier bar arch 25 is flattened into an elongated blade carrier 26, here of uniform width and thickness throughout its length. A smooth, countersunk hole 27 and a slot 28 at about equal distances from the center of gravity 22, provide for the firm holding of the removable blade and its remounting to the former position after sharpening. For these purposes the blade has a threaded hole 29 and a T-bolt 30. When replacing the blade (Fig. 7) the T-bolt is inserted in the slot 28, the blade being held at right angles to the carrier 26. Thereupon the blade is given a quarter-turn to set the T-bolt crosswise of the slot (Fig. 6), and a screw 31 is driven through from the top of the carrier and into the blade.

The shank of the T-bolt and the screw center the blade cross-wise of the carrier 26, and are regarded as the simplest in equipment for allowing the removal of the blade and its restoration to its original position. Only one fastening screw is required with this arrangement, and the exposed head of the T-bolt is rounded so as not to tangle with weeds or grass.

Knife edges 35 are provided by beveling the longitudinal edges of either the working head as in Figs. 1, 2 and 4, or by beveling the longitudinal sides of the blade 12. In Fig. 8 the cutting edges 32 consist of corrugations or scallops of U-form. These scallops, like the cutting edges in the preceding forms, are beveled back into the substance of the blade. The teeth resulting from the scallops are easily sharpened. The blade being of the removable type already described in Figs. 6 and 7, is simply held against a revolving grindwheel, preferably one flat side thereof, so as to uniformly abrade the flat bottom of the blade. The teeth thus become sharpened, and there is no need for precaution to maintain any concavity or of otherwise treating the teeth to maintain their configuration.

Brief reference is made to Fig. 4 because of the nature of use of the implement. Here the working head 11 has the main features shown in Fig. 2, but has added to it a sharpening of the free extremity as at 36. This produces an implement which will prove useful in cutting heavy brush and the like. The principles of intersection of the working head by the extended axis of the handle and the progressive increase of weight out toward the free end are of particular value in this particular tool.

In Fig. 9 the increasing weight of the blade 12 is produced by making the free end 37 thicker than the inner end (proximate to the handle). In Fig. 10 the carrier bar 13 is made thicker at its free end 38 than where it joins the arch 25.

Briefly reviewing the operation, the implement is swung like a golf club in cutting weeds, grass and similar growths, and as the cutting blade crosses the growth the latter is mowed down, falling back across the blade and away from the working head. Major importance is attached to the fact that the cutting blade is flared away from the handle, out to the free end. This flaring establishes a progressively increasing weight without encumbering the blade or the working head with swellings, enlargements, bulges or other impedimenta that could reduce the value of the implement by entangling with the growth.

The foregoing weight distribution in the cutting blade is augmented by judiciously fixing the center of gravity at a midpoint of the blade, approximately half-way between the extremity of the blade and the place where it joins the arch of the working head. The center of gravity coincides with the axis of the handle, so that when the user swings the implement, he is really swinging the center of gravity on the cutting arc.

What is claimed is:

1. An implement usable with a swinging stroke for cutting weeds comprising an elongated handle, an elongated head attached to said handle, said head increasing in weight from one end to the other and with an extended portion connecting the lighter end of the same to said handle so that said head is disposed at an obtuse angle to said handle, said head having its weight distributed in such a manner that its center of gravity is located approximately at the point of intersection of the axis of said handle extended with said head thereby providing balance for the implement during the swinging thereof, said head having at least one longitudinally disposed cutting edge.

2. The structure of claim 1 in which the axis of the handle extended substantially intersects the longitudinal and transverse axes of the cutting head.

3. The structure of claim 2 in which the weight of the cutting head at one side of the point of intersection of the handle extended and the longitudinal and transverse axes of the head counterbalance the weight at the other side of such point of intersection whereby the implement may be spun about the axis of the handle.

4. The structure of claim 1 in which the center of gravity of the head is located not more than 1½" forwardly and 1" rearwardly of the intersection of the axis of the shaft or handle extended and the longitudinal axis of said head.

5. The structure of claim 1 in which the axis of the handle intercepts the longitudinal axis of the blade near the central portion thereof.

References Cited in the file of this patent

UNITED STATES PATENTS

| 1,699,178 | Board et al. | Jan. 15, 1929 |
| 2,033,797 | Whitney | Mar. 10, 1936 |
| 2,151,577 | Withington | Mar. 21, 1939 |

FOREIGN PATENTS

| 23,223 | Australia | June 24, 1935 |
| 125,294 | Great Britain | Apr. 17, 1919 |